US010381641B2

(12) United States Patent
Chen et al.

(10) Patent No.: US 10,381,641 B2
(45) Date of Patent: Aug. 13, 2019

(54) HOLLOW SILICON STRUCTURES FOR USE AS ANODE ACTIVE MATERIALS IN LITHIUM-ION BATTERIES

(71) Applicant: UWM Research Foundation, Inc., Milwaukee, WI (US)

(72) Inventors: Junhong Chen, Whitefish Bay, WI (US); Xingkang Huang, Shorewood, WI (US)

(73) Assignee: UWM RESEARCH FOUNDATION, INC., Milwaukee, WI (US)

( * ) Notice: Subject to any disclaimer, the term of this patent is extended or adjusted under 35 U.S.C. 154(b) by 948 days.

(21) Appl. No.: 14/670,022

(22) Filed: Mar. 26, 2015

(65) Prior Publication Data
US 2015/0280229 A1  Oct. 1, 2015

Related U.S. Application Data

(60) Provisional application No. 61/973,798, filed on Apr. 1, 2014.

(51) Int. Cl.
*H01M 4/38* (2006.01)
*H01M 10/0525* (2010.01)
(Continued)

(52) U.S. Cl.
CPC ......... *H01M 4/386* (2013.01); *H01M 4/0428* (2013.01); *H01M 4/587* (2013.01);
(Continued)

(58) Field of Classification Search
CPC ........... H01M 10/052; H01M 10/0525; H01M 2004/021; H01M 2004/027;
(Continued)

(56) References Cited

U.S. PATENT DOCUMENTS

2004/0023590 A1  2/2004  Yoshikawa et al.
2013/0320582 A1  12/2013  Cui et al.

FOREIGN PATENT DOCUMENTS

CN  101074306  11/2007
CN  101225245  7/2008
(Continued)

OTHER PUBLICATIONS

PCT International Search Report and Written Opinion dated Oct. 2, 2015.
(Continued)

*Primary Examiner* — Sarah A. Slifka
*Assistant Examiner* — Lilia Nedialkova
(74) *Attorney, Agent, or Firm* — Fletcher Yoder, P.C.

(57) ABSTRACT

The present disclosure relates generally to the field of lithium-ion batteries and battery modules. More specifically, the present disclosure relates to Si-based anode materials for use as anode active materials for lithium-ion batteries. One example includes micron/nano-scale structures that include a carbonate template structure and a silicon (Si) layer conformally deposited over the carbonate template. Another example includes a hollow, micron/nano-scale silicon structure having an oxygen content less than approximately 9%, wherein the interior of the hollow micron/nano-scale silicon structure is substantially free of carbon.

19 Claims, 15 Drawing Sheets

(51) Int. Cl.
| | |
|---|---|
| *H01M 10/052* | (2010.01) |
| *H01M 4/02* | (2006.01) |
| *H01M 4/04* | (2006.01) |
| *H01M 4/587* | (2010.01) |

(52) U.S. Cl.
CPC ..... *H01M 10/052* (2013.01); *H01M 10/0525* (2013.01); *H01M 2004/021* (2013.01); *H01M 2004/027* (2013.01)

(58) Field of Classification Search
CPC .... H01M 4/0428; H01M 4/386; H01M 4/587; C01P 2004/34; C01P 2004/36; C01P 2004/45; C01P 2004/30; C01P 2004/32; B22F 2304/05; B22F 2304/052; B22F 2304/054; B22F 2304/056; B22F 2304/058; B22F 2304/10; B22F 2001/0037; B22F 1/0025; B22F 1/0018; B22F 1/0044; B82Y 30/00; B82Y 40/00; B82Y 5/00
See application file for complete search history.

(56) References Cited

FOREIGN PATENT DOCUMENTS

| JP | 2002086902 | 3/2002 | | |
|---|---|---|---|---|
| JP | 2003115260 | 4/2003 | | |
| WO | WO-2013179068 A2 | * 12/2013 | ........... | C01B 33/023 |
| WO | 2015010230 A1 | 1/2015 | | |

OTHER PUBLICATIONS

Chang, J. et al., "Multilayered Si Nanoparticle/Reduced Graphene Oxide Hybrid as a High-Performance Lithium-Ion Battery Anode," Advanced Materials, vol. 26, pp. 758-764 (2014).
Chen, D. et al, "Reversible lithium-ion storage in silver-treated nanoscale hollow porous silicon particles," Angewandte Chemie, vol. 51, pp. 2409-2413 (2012).
Chen, H.X. et al., "Silicon nanowires with and without carbon coating as anode materials for lithium-ion batteries," Journal of Solid State Electrochemistry, vol. 14, pp. 1829-1834 (2010).
Deng, J. et al., "Naturally Rolled-up C/Si/C Trilayer Nanomembranes as Stable Anodes for Lithium-ion Batteries with Remarkable Cycling Performance," Angewandte Zuschriften, vol. 125, pp. 2382-2386 (2013).
Esmanski, A. et al., Silicon Inverse-Opal-Based Macroporous Materials as Negative Electrodes for Lithium Ion Batteries, Advanced Functional Materials, vol. 19, pp. 1999-2010 (2009).
Fleischauer, M.D. et al., "Simple Model for the Capacity of Amorphous Silicon-Aluminum-Transition Metal Negative Electrode Materials," Journal of the Electrochemical Society, vol. 153, pp. A1201-A1205 (2006).
Ge, M. et al., "Porous doped silicon nanowires for lithium ion battery anode with long cycle life," Nano Letters, vol. 12, pp. 1318-2323 (2012).
Goldman, J.L. et al., "Strain anisotropies and self-limiting capabilities in single-crystalline 3D silicon microstructures: models for high energy density lithium-ion battery anodes," vol. 21, pp. 2412-2422 (2011).
Hertzberg, B. et al., "Deformations in Si-Li Anodes Upon Electrochemical Alloying in Nano-Confined Space," Journal of the American Chemical Society, vol. 132, pp. 8548-8549 (2010).
Huang, X. et al., "Controllable Synthesis of Hollow Si Anode of Long-Cycle-Life Lithium-ion Batteries," Advanced Materials, vol. 26, pp. 4326-4332 (2014).
Huang, X. et al., "Improved Cyclic Performance of Si Anodes for Lithium-Ion Batteries by Forming Intermetallic Interphases between Si Nanoparticles and Metal Microparticles," ACS Applied Materials & Interfaces, vol. 5, pp. 11965-11970 (2013).
Jeong, H.M. et al., "Silicon@porous nitrogen-doped carbon spheres through a bottom-up approach are highly robust lithium-ion battery anodes," RSC Advances, vol. 2, pp. 4311-4317 (2012).
Kim, H. et al., "Three-dimensional porous silicon particles for use in high-performance lithium secondary batteries," Angewandte Chemie, vol. 120, pp. 10305-10308 (2008).
Kong, J. et al., "Silicon nanoparticles encapsulated in hollow graphitized carbon nanofibers for lithium ion battery anodes," Nanoscale, vol. 5, pp. 2967-2973 (2013).
Li, X. et al., "Hollow core-shell structured porous Si-C nanocomposites for Li-ion battery anodes," Journal of Materials Chemistry, vol. 22, pp. 11014-11017 (2012).
Liu, M.P. et al., "Facile preparation of silicon hollow spheres and their use in electrochemical capacitive energy storage," ChemComm, vol. 48, pp. 4950-4952 (2012).
Liu, N. et al., "A Yolk-Shell Design for Stabilized and Scalable Li-Ion Battery Alloy Anodes," Nano Letters, vol. 12, pp. 3315-3321 (2012).
Liu, X.H. et al., "In situ atomic-scale imaging of electrochemical lithiation in silicon," Nature Nanotechnology, vol. 7, pp. 749-756 (2012).
Luo, J. et al., "Crumpled Graphene-Encapsulated Si Nanoparticles for Lithium Ion Battery Anodes," Journal of Physical Chemistry Letters, vol. 3, pp. 1824-1829 (2012).
Magasinski, A. et al., "High-performance lithium-ion anodes using a hierarchical bottom-up approach," Nature Materials, vol. 9, pp. 353-358 (2010).
Mu, C. et al., "Silicon Nanotube Array/Gold Electrode for Direct Electrochemistry of CytoChrome c," Journal of Physical Chemistry, vol. 111, pp. 1491-1495 (2007).
Park, M.H. et al., "Silicon Nanotube Battery Anodes," Nano Letters, vol. 9, pp. 3844-3847 (2009).
Park, Y. et al., "Si-Encapsulating Hollow Carbon Electrodes via Electroless Etching for Lithium-Ion Batteries," Advanced Energy Materials, vol. 3, pp. 206-212 (2013).
Ren, J.G. et al., "Silicon-Graphene Composite Anodes for High-Energy Lithium Batteries," Energy Technology, vol. 1, pp. 77-84 (2013).
Tarascon, J.M. et al., "Issues and Challenges Facing Rechargeable Lithium Batteries," Nature, vol. 414, pp. 359-367 (2001).
Vu, A. et al., "Porous Electrode materials for lithium-ion batteries—how to prepare them and what makes them special," Advanced Energy Materials, vol. 2, pp. 1056-1085 (2012).
Wang, J.W. et al., "Two-phase electrochemical lithiation in amorphous silicon," Nano Letters, vol. 13, pp. 709-715 (2013).
Wang, Y.X. et al., "Nanocomposites of silicon and carbon derived from coal tar pitch: cheap anode materials for lithium-ion batteries with long cycle life enhanced capacity," Electrochimica Acta, vol. 93, pp. 213-221 (2013).
Wen, Z.H. et al., "Silicon nanotube anode for lithium-ion batteries," Electrochemistry Communications, vol. 29, pp. 67-70 (2013).
Wu, H. et al., "Engineering empty space between Si nanoparticles for lithium-ion battery anodes," Nano Letters, vol. 12, pp. 904-909 (2012).
Wu, H. et al., "Stable cycling of double-walled silicon nanotube battery anodes through solid-electrolyte interphase control," Nature Technology, vol. 7, pp. 310-315 (2012).
Wu, H. et al., "Stable Li-ion battery anodes by in-situ polymerization of conducting hydrogel to conformally coat silicon nanoparticles," nature communications, vol. 4, pp. 1-6 (2013).
Yang, Y. et al., "Graphene encapsulated and SiC reinforced silicon nanowires as an anode material for lithium ion batteries," Nanoscale, vol. 5, pp. 8689-8694 (2013).
Yao, Y. et al., "Interconnected silicon hollow nanospheres for lithium-ion battery anodes with long cycle life," Nano Letters, vol. 11, pp. 2949-2954 (2011).
Yi, R. et al., "Micro-sized Si-C composite with interconnected nanoscale building blocks as high-performance anodes for practical application in lithium-ion batteries," vol. 3, pp. 295-300 (2013).
Yu, Q. et al., "The effect of polyacrylamide on the crystallization of calcium carbonate synthesis of aragonite single-crystal nanorods and hollow vatarite hexagons," Journal of Crystal Growth, vol. 286, pp. 178-183 (2006).

(56) References Cited

OTHER PUBLICATIONS

Yu, Y. et al., "Reversible Storage of Lithium in silver-coated three-dimensional macroporous silicon," Advanced Materials, vol. 22, pp. 2247-2250 (2010).

* cited by examiner

US 10,381,641 B2

HOLLOW SILICON STRUCTURES FOR USE AS ANODE ACTIVE MATERIALS IN LITHIUM-ION BATTERIES

CROSS REFERENCE

This application claims priority from and the benefit of U.S. Provisional Application Ser. No. 61/973,798, entitled "HOLLOW SILICON ANODE MATERIAL," filed Apr. 1, 2014, which is hereby incorporated by reference in its entirety for all purposes.

BACKGROUND

The present disclosure relates generally to the field of lithium-ion batteries and battery modules. More specifically, the present disclosure relates to Si-based anode materials for lithium-ion batteries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Silicon (Si), as an anode material for lithium-ion batteries, offers a theoretical capacity that is approximately ten times that of the present commercial graphite anodes. However, typical Si anodes have a low cycle life due to the stresses associated with the large (e.g., approximately 300%) change in volume as lithium ions are transported into and out of the Si anode material, which results in cracking and eventual pulverization of the Si anode over repeated charging and discharging cycles. One strategy to address this cycling performance issue is to use Si/carbon (C) composites or Si—C alloys; however, the C can limit the capacity of the anode. Another strategy is to use porous Si structures with sufficient voids to directly buffer the volume change upon lithiation.

Porous Si structures, such as hollow Si particles, are typically synthesized using conventional templating materials, such as carbon, surfactants, and silica ($SiO_2$). Removal of carbon/surfactant templates usually involves combustion in an oxygen-rich atmosphere, which leaves residual C impurities on the surface of the Si structures. In particular, the residual C impurities may be concentrated at the inner walls of the porous Si structures, and may prevent the Si structure from expanding inward upon lithiation, leading to a poorer cyclic performance of the Si anode. Furthermore, exposing Si structures to an oxygen-rich atmosphere (or using silica as a template material) can also oxidize a substantial portion of the Si to silica ($SiO_2$), and $SiO_2$ may react with Si at elevated temperatures to form other $SiO_x$ species. The high $SiO_x$ content of the resulting Si structures can also diminish the performance of a Si anode. Additionally, prior to the present disclosure, the synthesis of hollow or porous Si structures typically involved the use of certain chemicals, such as hydrofluoric acid (HF), magnesium (Mg), and cetyltrimethylammonium bromide ($C_{19}H_{42}BrN$), which can pose additional cost in handling and waste disposal as well as hinder large-scale production of hollow Si structures using these techniques.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to micron/nano-scale structures that include a carbonate template structure and a silicon (Si) layer conformally deposited over the carbonate template.

The present disclosure also relates to a hollow, micron/nano-scale silicon structure having an oxygen content less than approximately 9%, wherein the interior of the hollow micron/nano-scale silicon structure is substantially free of carbon.

The present disclosure further relates to a lithium-ion battery cell that includes an anode having an anode active layer. The anode active layer includes a binder, a conductive carbon, and a plurality of hollow silicon structures having an oxygen content less than approximately 9%, wherein the interior surfaces of the plurality of hollow silicon structures are substantially free of carbon.

The present disclosure further relates to a method of manufacturing that includes forming a plurality of carbonate template structures, depositing silicon over the plurality of carbonate template structures, and dissolving the plurality of carbonate template structures to yield a plurality of hollow silicon structures having an oxygen content less than approximately 9%, wherein the interior surfaces of the hollow silicon structures are substantially free of carbon.

The present disclosure further relates to a method of manufacturing that includes forming a plurality of carbonate template structures, depositing carbon over the plurality of carbonate template structures, and dissolving the plurality of carbonate template structures to yield a plurality of hollow carbon structures that are substantially free of a carbon-growth catalyst.

DRAWINGS

Various aspects of this disclosure may be better understood upon reading the following detailed description and upon reference to the drawings in which.

DETAILED DESCRIPTION

Figure 2:
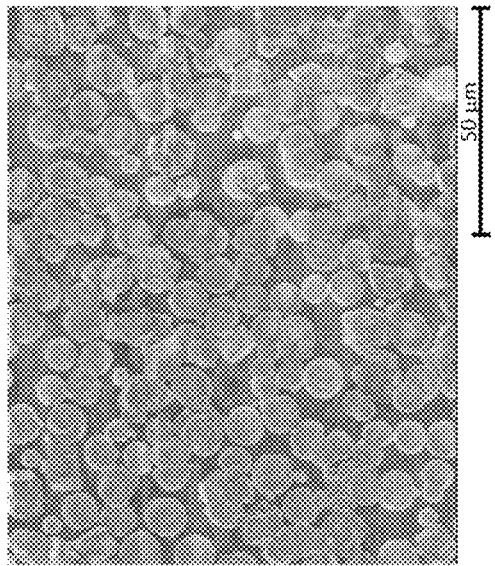
FIG. 2 is a SEM image illustrating example spherical carbonate template structures, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, "micron-scale" refers to sizes ranging between approximately 1 µm and approximately 1000 µm, while "nano-scale" refers to sizes ranging between approximately 1 nm and approximately 1000 nm. As used herein, a "micron/nano-scale" refers to a sizes ranging between approximately 1 nm and approximately 1000 µm. As used herein, the "length" of a structure refers to the longest dimension of the structure. For example, the "length" of a spherical structure is equivalent to the diameter of the spherical structure (or the longest diameter for an irregular sphere), and the "length" of a cubic structure is equivalent to the length of a side of the cubic structure (or the longest side for an irregular cube). As used herein, "approximately" or is intended to cover a disclosed or recited value, as well as values that are within ±5% the disclosed or recited value. As used herein, materials may be described as having "substantially no" or being "substantially free of" a substance, which should be interpreted to include materials that are completely free of detectable amounts of the disclosed or recited substance, as well as materials that only include a trace amount (i.e., less than 100 parts per million) of the disclosed or recited substance. As used herein, the "oxygen content" of a silicon material refers to the atomic ratio of oxygen to the other atoms of the material, wherein this oxygen may be present as any form of silicon oxide (e.g., $SiO_x$, silica, silicates). As used herein, the "carbon content" of a silicon material refers to the atomic ratio of carbon to the other atoms of the material, wherein this carbon may be present as any form (e.g., soot, carbonate, silicon carbide (SiC)). As used herein, an "anode" refers to an electrode of a lithium-ion battery cell that includes an active layer disposed on a surface of a metallic current collecting layer (e.g., a metal strip or plate). As used herein, an "anode active layer" or an "active layer of an anode" refers to a film that is deposited on the surface of the metal layer to facilitate the electrochemistry of the lithium-ion battery cell, wherein the anode active layer includes a silicon anode active material. As used herein, "anode loading" or "loading of an anode" refers to the weight (e.g., in milligrams) of the active layer per unit area (e.g., in $cm^2$) of the anode. As used herein, "anode active material" or "active material of an anode" refers to the Si-based materials that are part of the active layer of an anode of a lithium-ion battery. Charge and discharge rates may be described herein in terms of C-rates (i.e., 1 C, 2 C, C/2), wherein the number indicates the amount of charge (in Coulombs) per second passing into or out of the battery cell (i.e., 1 C=2400 mA/g).

The present disclosure is directed toward manufacturing hollow Si structures using carbonates as templates. As discussed in greater detail below, first the carbonate template particles are prepared, followed by Si deposition. Subsequently, the resulting deposition material is washed with a dilute acid solution to dissolve the carbonate template particles, yielding hollow Si structures. As discussed below, the morphology of the hollow Si structures is controllable to provide a variety of shapes, including cubes, spheres, tubes, and flowers, each having tunable dimensions. By using carbonates as templates, the disclosed synthesis techniques avoid the use of HF and surfactants, and yield hollow Si structures that are mostly or entirely free of impurities, such as carbon and oxygen species. When used as the anode active material of a lithium-ion battery, the disclosed hollow Si structures demonstrate good capacity, low impedance, and excellent cyclic performance. While the advantages of the disclosed hollow Si structures are discussed below in the context of anode active materials for lithium-ion batteries, it may be appreciated that these hollow Si structures may also be useful in the manufacture of other Si-based systems, such as solar cells and capacitors.

Prior to the present work, using carbonates as templates for the production of hollow Si structures has not been previously disclosed. This is likely due to undesirable reactions that can occur between the carbonate templates and Si during Si deposition. For example, thermodynamic calculations indicate undesirable reactions between Si and certain carbonate species (e.g., calcium carbonate ($CaCO_3$), sodium carbonate ($Na_2CO_3$), and barium carbonate ($BaCO_3$)) are quite energetically favorable at the elevated temperatures (e.g., 420° C. or more) that are used to deposit Si on the templates. However, surprisingly, the presently disclosed unexpected experimental results indicate no substantial reaction between Si and the carbonate templates at deposition temperatures as high as 500° C.

Accordingly, it is presently recognized that the solid-state reactions between Si and certain carbonates are sufficiently slow to allow the preparation of hollow Si structures using as templates any carbonate having a decomposition temperature greater than the Si deposition temperature. For example, when chemical vapor deposition (CVD) is used to deposit Si over the carbonate templates at 500° C., any carbonate having a decomposition temperature higher than 500° C. (e.g., $CaCO_3$, $BaCO_3$, $Na_2CO_3$, potassium carbonate ($K_2CO_3$), and lithium carbonate ($Li_2CO_3$)) can be used as templates to fabricate hollow Si structures.

Carbonate Template Particles

Figure 1:
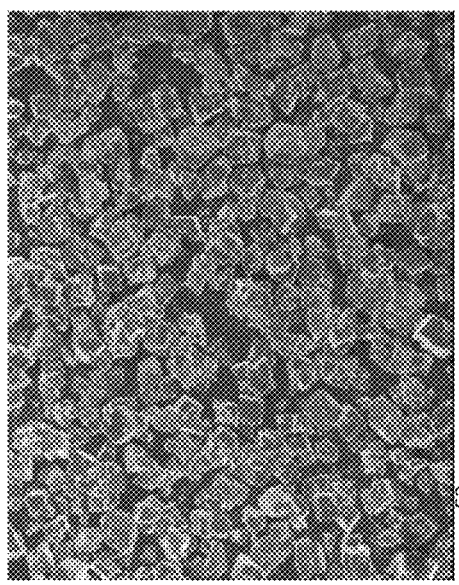
FIG. 1 is a scanning electron microscope (SEM) image illustrating example cubic carbonate template structures, in accordance with present embodiments.

The morphology of the carbonate template structures can be tuned by controlling the synthesis conditions. For example, carbonate template structures of different morphologies can be produced by reacting a dissolvable metal salt (e.g., a dissolvable calcium or barium salt) with a carbonate source (e.g., sodium carbonate ($Na_2CO_3$) or sodium bicarbonate ($NaHCO_3$)) using different reaction times and/or temperatures. By specific example, cubic $CaCO_3$ template structures were synthesized by mixing a calcium chloride ($CaCl_2$) solution (e.g., 100 mL of a 0.1 molar (M) solution) with a $Na_2CO_3$ solution (e.g., 100 mL of a 0.1 M solution) under vigorous stirring (e.g., 1,200 rpm) for 24 h. The resulting precipitates were filtered, washed with de-ionized (DI) water and isopropanol, and dried at 80° C. overnight. FIG. 1 is a scanning electron microscope (SEM) image illustrating example cubic carbonate template structures synthesized in this manner. Based on X-ray diffraction (XRD) analysis, the cubic $CaCO_3$ template structures include mostly calcite.

In another example, spherical $CaCO_3$ template structures were synthesized by mixing a $CaCl_2$ solution (e.g., 100 mL of a 0.1 molar (M) solution) with a $Na_2CO_3$ solution (e.g., 100 mL of a 0.1 M solution) under vigorous stirring (e.g., 1,200 rpm) for 5 min. The resulting precipitates were filtered, washed with DI water and isopropanol, and dried at 80° C. overnight. FIG. 2 is a SEM image illustrating example spherical carbonate template structures synthesized in this manner. Based on XRD analysis, the spherical CaCO3 mainly includes vaterite, with some calcite impurities.

Figure 3:
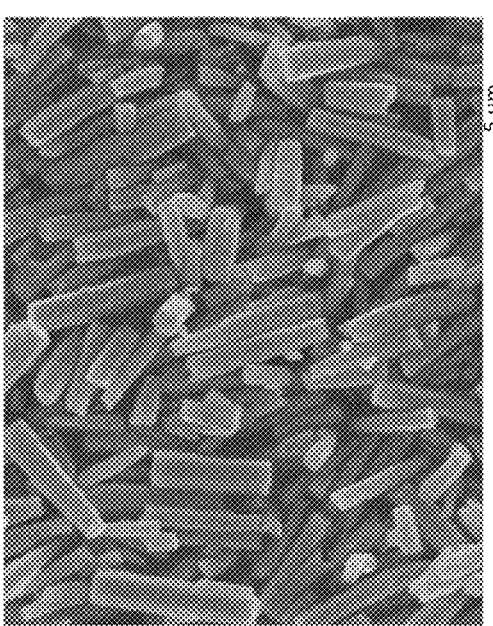
FIG. 3 is a SEM image illustrating example rod-shaped carbonate template structures, in accordance with present embodiments.

In another example, rod-shaped $BaCO_3$ template structures were prepared by pouring a barium nitrate ($Ba(NO_3)_2$) solution (e.g., 100 mL of a 0.1 M solution) into a $NaHCO_3$ solution (e.g., 100 mL of a 0.1 M solution) and allowing the solutions to react at RT for 30 min. The resulting precipitates were filtered, washed with DI water and isopropanol, and dried at 80° C. overnight. FIG. 3 is a SEM image illustrating example rod-shaped carbonate template structures synthesized in this manner.

Figure 4:
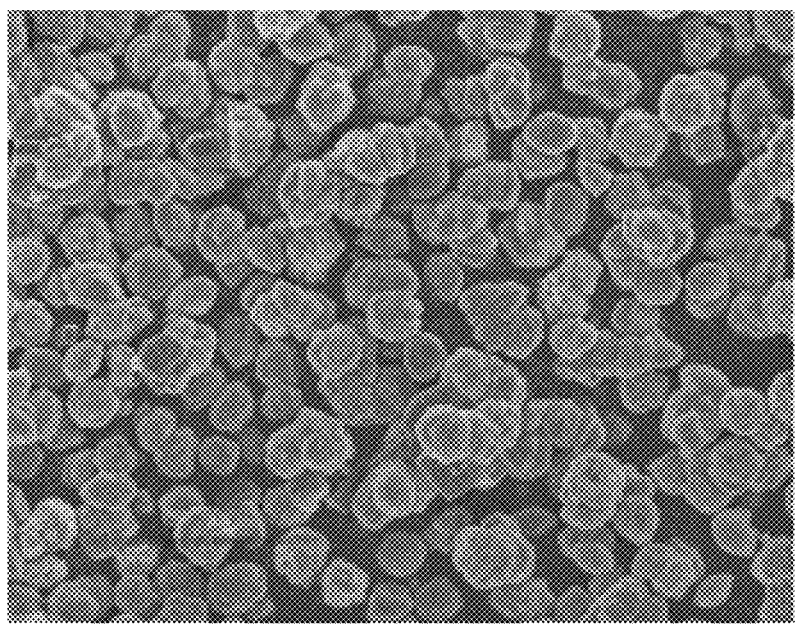
FIGS. 4 and 5 are SEM images at different magnifications illustrating examples of closed-flower carbonate template structures, in accordance with present embodiments.
Figure 5:
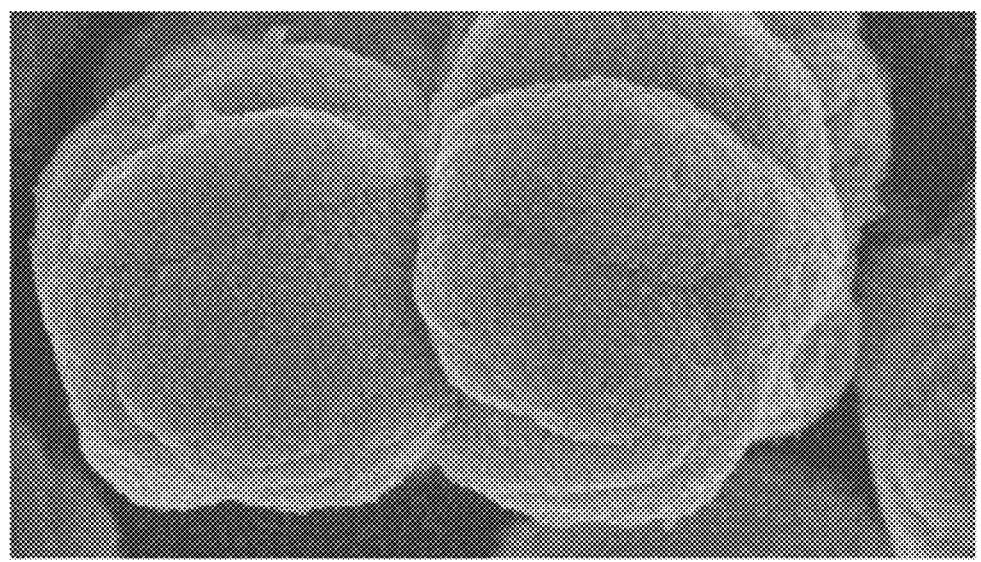

In another example, irregular $CaCO_3$ template structures were synthesized by mixing a $CaC_{12}$ solution (e.g., 100 mL of a 0.1 molar (M) solution) with a $Na_2CO_3$ solution (e.g., 100 mL of a 0.1 M solution) under vigorous stirring (e.g., 1,200 rpm) at 5° C. for 30 min. The resulting precipitates were filtered, washed with DI water and isopropanol, and dried at 80° C. overnight. FIGS. 4 and 5 are SEM images at different magnifications illustrating examples carbonate template structures synthesized under these conditions, which may be described as having a closed-flower or pumpkin-like shape. Based on XRD analysis, these closed-flower carbonate template structures includes mainly sphere-like vaterite, with a minor amount of calcite impurity.

Hollow Si Structures

Si can be deposited on the carbonate template structures described above using CVD. For example, in an embodiment, these carbonate template structures may be disposed in a combustion boat and loaded into a tube furnace. The carbonate template structures may then be placed under vacuum (e.g., approximately −30 inches of mercury (in. Hg)), heated to the Si deposition temperature (e.g., 420° C. or higher), and a stream of a feedstock gas (e.g., silane ($SiH_4$)) may be added to the tube furnace at a particular flow rate (e.g., 30 milliliters per min (mL/min)). The thickness of the resulting hollow Si structures is also easily controllable by modifying the Si deposition parameters, such as the flow rate of the feedstock gas, deposition temperature, and deposition time. For example, in certain embodiments, the thickness of the Si layer may be less than approximately 500 nm, less than approximately 100 nm, or approximately 40 nm. It is believed that the uniformity of the Si coating layer can be improved by using vacuum deposition. Additionally, it is believed that a fluidized bed CVD system may help to further increase the uniformity of the Si coating layer and help to scale up the synthesis of hollow Si.

Figure 6:
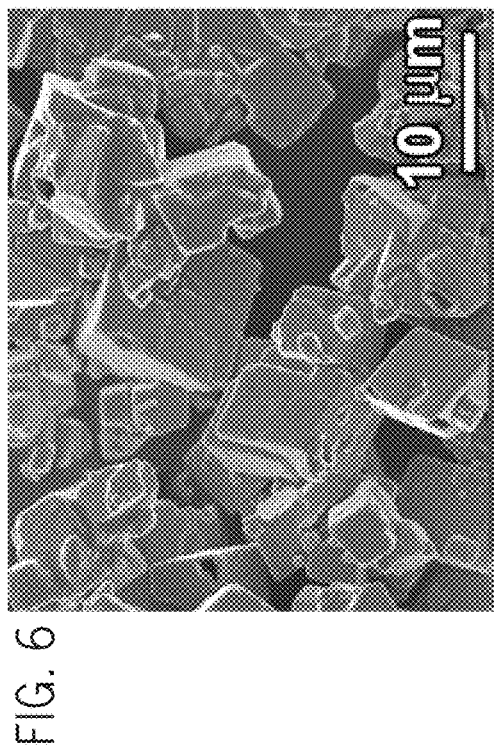
FIGS. 6-8 are SEM images illustrating hollow Si cubes produced using the cubic carbonate template structures of FIG. 1, in accordance with present embodiments.
Figure 8:
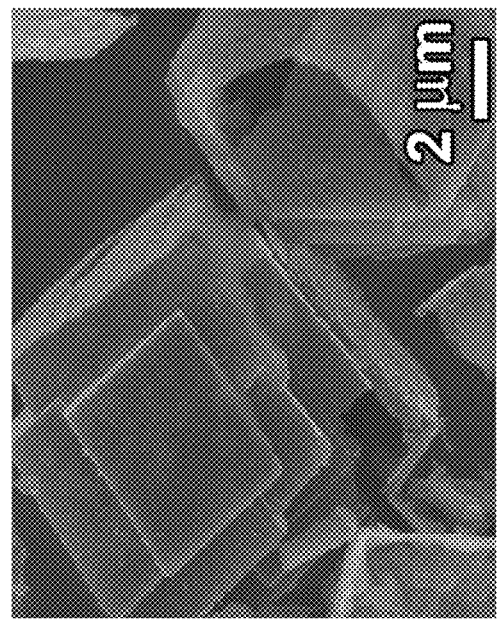
Figure 7:
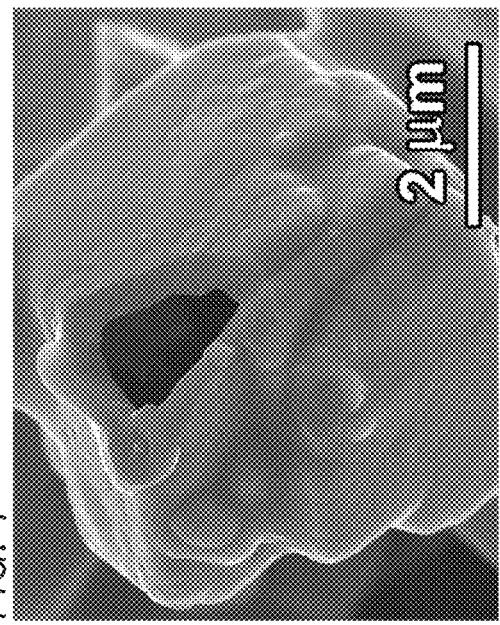
Figure 10:
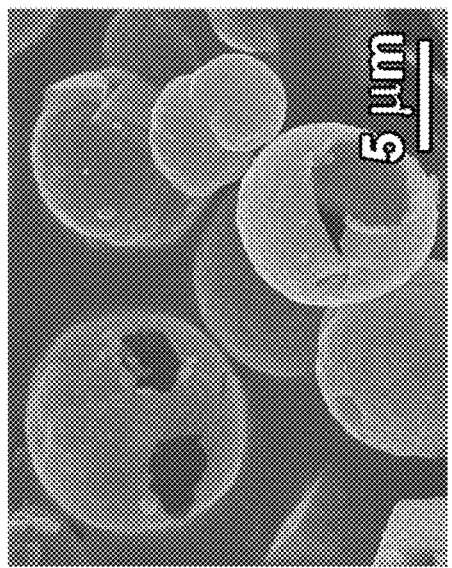
FIGS. 9-12 are SEM images illustrating hollow Si spheres produced using the spherical carbonate template structures of FIG. 2, in accordance with present embodiments.
Figure 12:
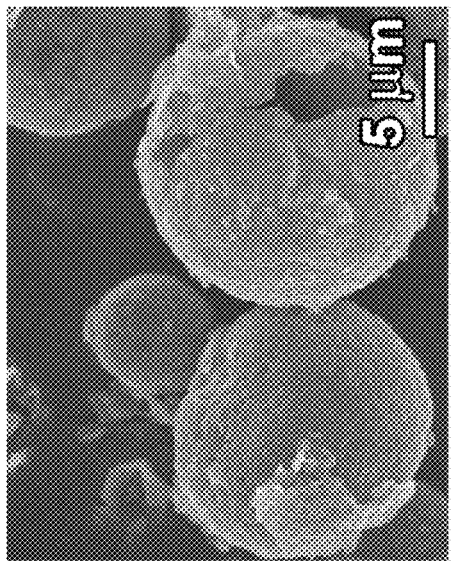
Figure 9:
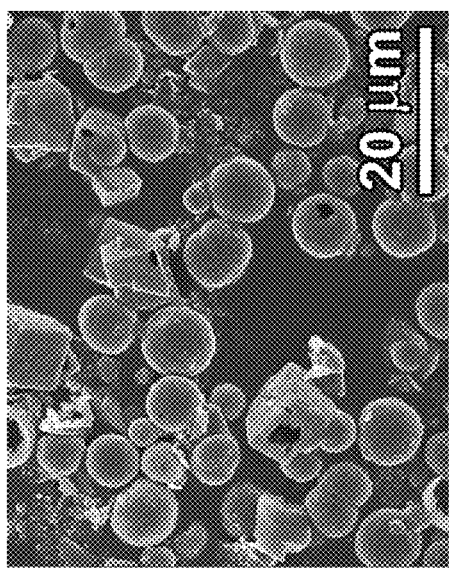
Figure 11:
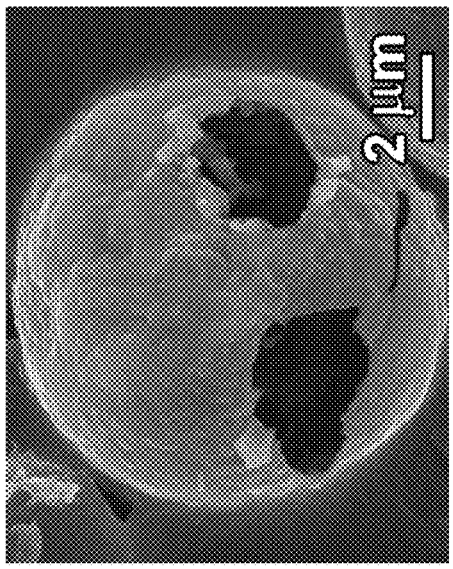

After deposition of Si, the resulting powders may be treated with a dilute acid to dissolve and remove the carbonate template structures below the deposited Si layer. For example, in certain embodiments, a dilute hydrochloric acid (HCl) solution may be used for this treatment. In certain embodiments, the dilute acid treatment may be followed by subsequent washes (e.g., DI water washes, isopropanol washes) to completely remove the dissolved carbonate template structures. After completion of the treatment (and appropriate wash steps), the resulting hollow Si structures may be dried under vacuum and/or at elevated temperatures (e.g., 60° C. overnight). FIGS. 6-17 are SEM images of resulting hollow Si with various morphologies. More specifically, FIGS. 6-8 illustrate hollow Si cubes obtained using the cubic $CaCO_3$ template structures discussed above and different Si deposition times (i.e., 4 h for FIGS. 6 and 7, 1 h Si for FIG. 8). FIGS. 9-12 illustrate hollow Si spheres obtained using the spherical $CaCO_3$ template structures discussed above and different Si deposition times (i.e., 4 h for FIG. 9, 2 h for FIGS. 10 and 11, 1 h for FIG. 12). Accordingly, as mentioned above, the sizes of hollow Si structures may be tuned by using different Si deposition times. For example, in certain embodiments, the hollow Si structures may have a length less than approximately 50 μm, less than approximately 20 μm, or less than approximately 10 μm. For example, in certain embodiments, the cubic and the spherical hollow Si structures may have a side or diameter between approximately 5 μm and approximately 10 μm in length. Additionally, after removal of carbonate templates as discussed above, XRD analysis of the hollow Si structures indicates only the presence of Si, without any detectable impurities such as silica or silicate. As such, it may be appreciated that, while similar spherical and cubic hollow Si structures have been previously disclosed, the purity of the presently disclosed spherical and cubic hollow Si structures is substantially higher than for other methods.

Figure 14:
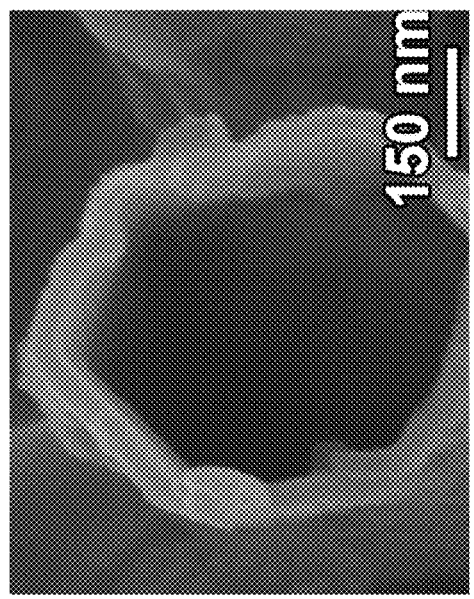
FIGS. 13 and 14 are SEM images illustrating tubular Si structures obtained using the rod-like carbonate template structures of FIG. 3, in accordance with present embodiments.
Figure 13:
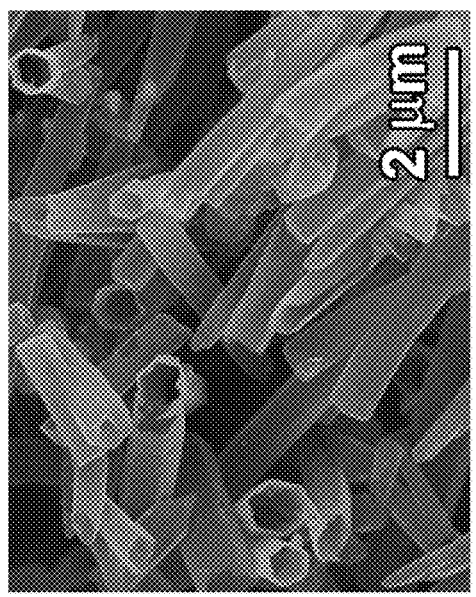

FIGS. 13 and 14 illustrate tubular Si structures obtained using the rod-like carbonate template structures discussed above. While similar tubular Si structures have been previously disclosed, other Si structures are typically produced using surfactant or polymer for the template, and, as mentioned above, it is difficult to avoid forming residual carbon from carbonized surfactants or polymers when they are removed via combustion. In contrast, XRD analysis indicates that the disclosed tubular Si structures are free of any detectable impurities. The example tubular Si structures illustrated in FIGS. 13 and 14 have diameters of approximately 500-700 nm and have a thickness of approximately 40 nm.

Figure 15:
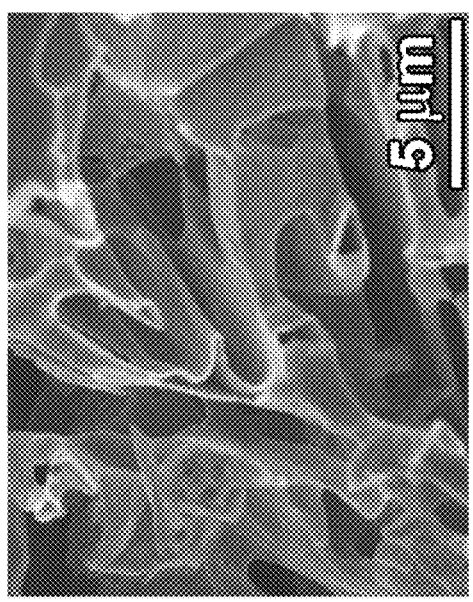
FIG. 15 illustrates an irregular porous Si material obtained using sodium carbonate as a template, in accordance with present embodiments.

FIG. 15 illustrates an irregular porous Si material obtained using commercially available $Na_2CO_3$ as a template, without additional processing or purification. After dilute acid treatment, no impurities were detected by XRD analysis. Accordingly, it is believed that any carbonates with decomposition temperatures higher than the silicon deposition temperature can be used as templates to fabricate hollow Si whose morphology is controllable through the morphology control of carbonate templates.

Figure 16:
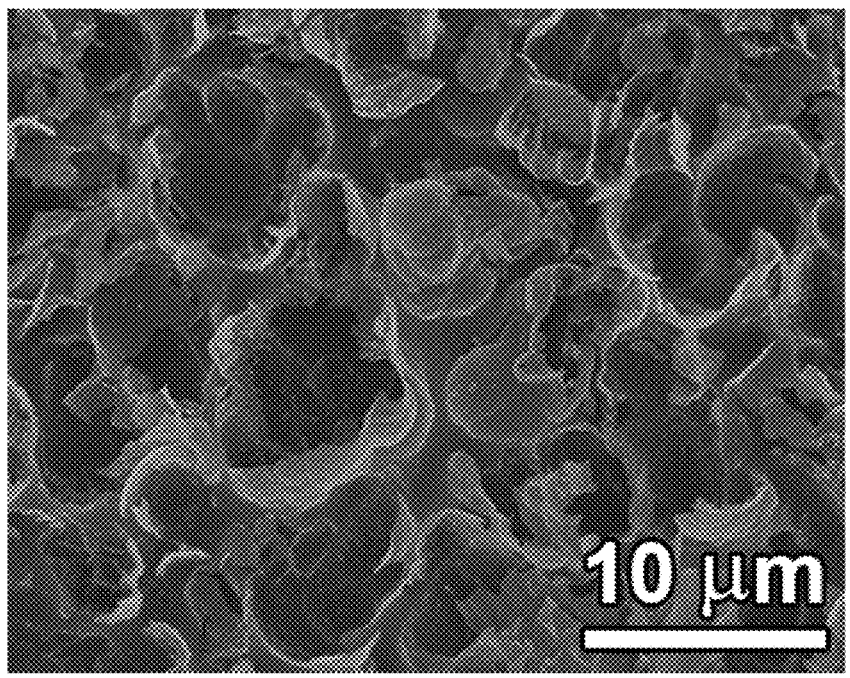
FIGS. 16 and 17 are SEM images illustrating flower Si structures obtained using the closed-flower carbonate template structures of FIGS. 4 and 5, in accordance with present embodiments.
Figure 17:
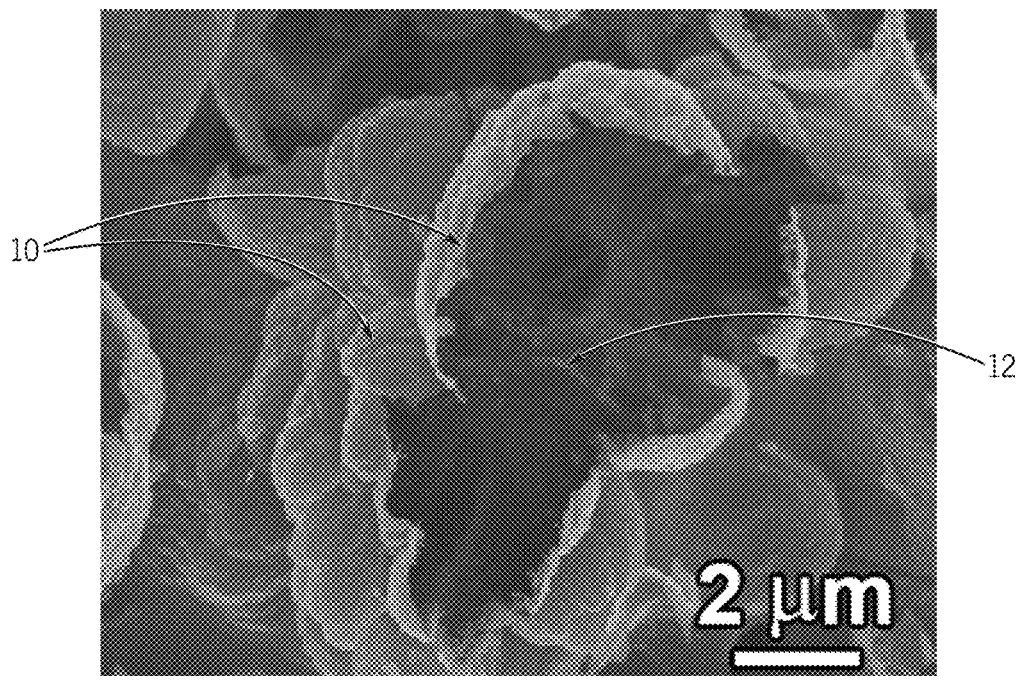
Figure 19:
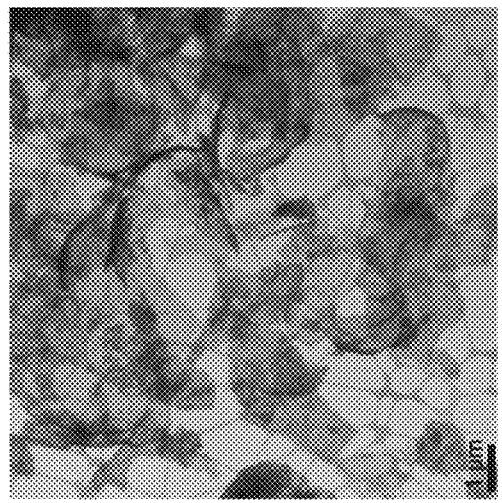
FIGS. 18-20 are transmission electron microscopy (TEM) images illustrating flower Si structures of FIGS. 16 and 17, in accordance with present embodiments.
Figure 18:
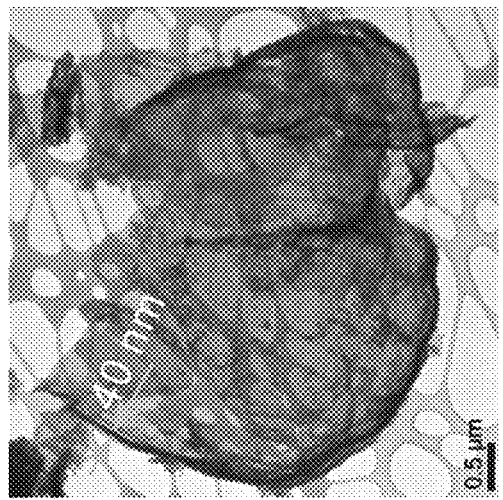
Figure 20:
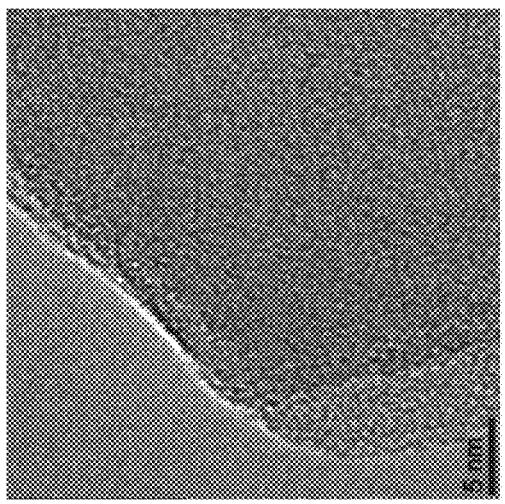

FIGS. 16 and 17 are SEM images, and FIGS. 18-20 are transmission electron microscopy (TEM) images, illustrating flower Si structures obtained using the closed-flower $CaCO_3$ template structures discussed above. For the illustrated embodiments, the flower Si structure includes a plurality of petals 10 that are approximately 40 nm thick and extend outwardly in an irregular fashion from a central portion 12 of the structure. In certain embodiments, the petals 10 of the flower Si structure may have a thickness generally less than approximately 100 nm Additionally, in certain embodiments, the distance between two petals 10 disposed on opposite sides of the central portion 12 may be between approximately 1 μm and approximately 20 μm, or between approximately 2 μm and approximately 10 μm.

It is believed that the observed flower morphology is a result of the closed-flower $CaCO_3$ template structure being an aggregate of numerous, nanometer-sized $CaCO_3$ primary structures. Accordingly, when the carbonate template structure is removed, as described above, the resulting hollow Si structure breaks at the aggregation interface of the primary structures, yielding the observed flower Si structures. As discussed below, when used as an anode active material, the petals 10 of the flower Si structures are believed to help to relieve the strain along the 2-dimensional (2D) Si wall, as well as along the thickness direction, during lithiation and delithiation, enabling improved cycling performance.

Figure 21:
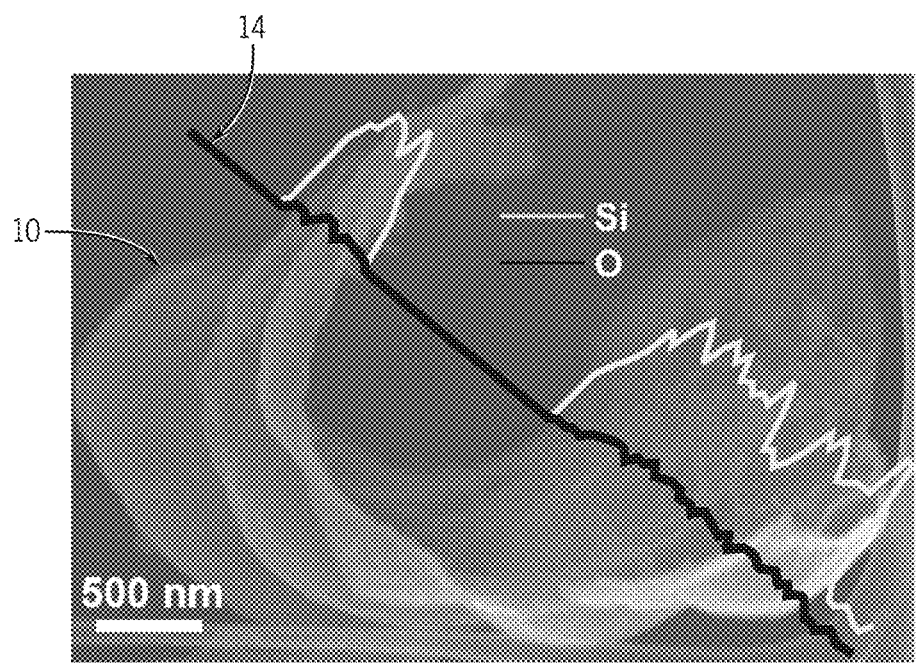
FIG. 21 is a SEM image with an energy dispersive X-ray spectroscopy (EDS) line scan analysis overlaid for a single petal of a flower Si structure, in accordance with present embodiments.

FIG. 21 is an SEM image with an energy dispersive X-ray spectroscopy (EDS) line scan analysis 14 overlaid for a single petal 10 of a flower Si structure. For the analyzed petal 10, the Si content is approximately 91 wt. %, the oxygen content is approximately 9 wt. %, and there was no observed carbon content. However, it is believed that the observed oxygen content is largely or entirely a result of oxygen reacting with the Si structures within the analysis system. Therefore, it is believed that that flower-shaped hollow Si structures can be produced in accordance with the present method having an oxygen content that is less than 9 wt. %, less than 5 wt. %, less than 2 wt. %, or having no substantial oxygen content.

Figure 22:
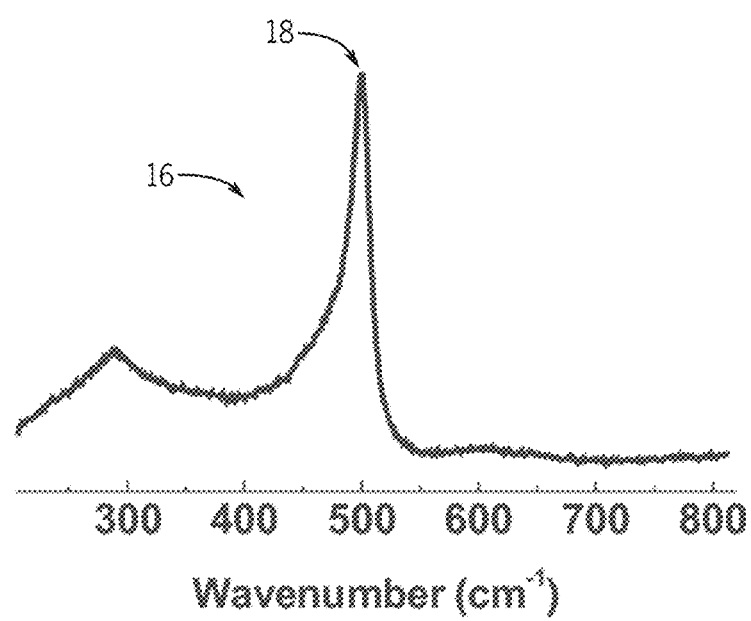
FIG. 22 is a typical Raman spectrum for a flower Si structure, in accordance with present embodiments.

FIG. 22 is a typical Raman spectrum 16 of an example flower Si structure. The Raman spectrum 16 exhibits a peak 18 at around 500 $cm^{-1}$, negatively shifted compared with that of the Si wafer (520 $cm^{-1}$). It is believed that this shift is indicative of the poorly crystallized structure of the flower Si structures. This conclusion is in good agreement with the broad peaks observed in the XRD analysis, the weak diffraction rings observed in the selected area electron diffraction (SAED) pattern, and the nanometer-sized crystallites in the high-resolution TEM image of FIG. 20. During operation of a Si anode, crystalline Si is transformed into amorphous $Li_xSi$ during lithiation, and this leads to a high gradient of Li+ concentration at the interface of the crystalline Si/amorphous $Li_xSi$, resulting in a strong mechanical stress that contributes to pulverization of traditional Si anodes. Accordingly, the poorly crystallized structure of the flower Si structures is believed to reduce this mechanical stress, enabling the production of Si anodes having improved cyclic performance.

Hollow Si Structures as an Anode Active Material

The charge/discharge performance was evaluated using coin cells (e.g., 2032-type coin cells) that include the disclosed hollow Si structures as the anode active material. These example coin cells were assembled in an argon-filled glove box with contents of oxygen and moisture below 1 parts per million (ppm). The anode of each cell was prepared by mixing the hollow Si structures as the active material, a binder (e.g., poly(acrylic acid)), and a conductive carbon (e.g., carbon black) in a particular weight ratio (e.g., 70:15:15) to form a slurry. The resulting slurries were coated onto a metallic foil (e.g., Cu foil having a thickness of 12 μm) using a doctor blade. After drying and pressing, the Cu foil was cut into disks (e.g., approximately 1 cm in diameter) with typical anode loadings of about 1 milligram per square centimeter ($mg/cm^2$). For these example coin cells, the electrolyte solution included 1 M lithium pentafluorophosphate ($LiPF_6$) dissolved in an ethylene carbonate/ethyl methyl carbonate mixture (e.g., 40:60 volume/volume ratio), with 10 wt % fluoroethylene carbonate as an additive. It may be appreciated that the design parameters of these coin cells are merely provided as examples and, in other embodiments, different materials, concentrations, dimensions may be used in conjunction with the disclosed hollow Si structures to produce lithium-ion battery cells. It may also be noted that these example coin cells demonstrate that lithium battery anodes can be manufactured with the disclosed hollow Si structures using materials and techniques that are common in lithium-ion battery manufacturing.

Figure 23:
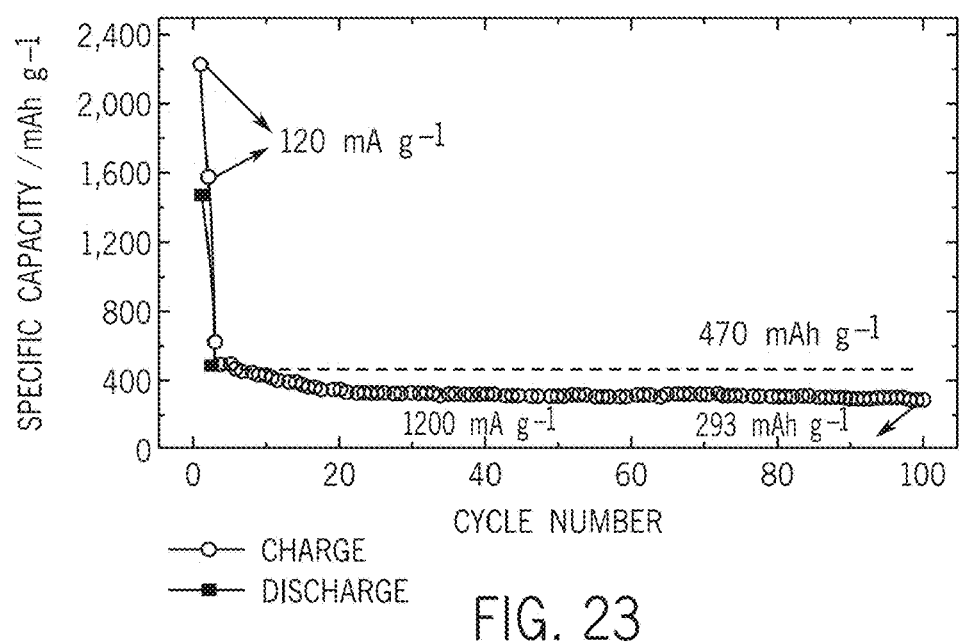
FIGS. 23-28 illustrate the cyclic performance of the example coin cells manufactured using the disclosed hollow Si structures as the anode active material, in accordance with present embodiments.
Figure 24:
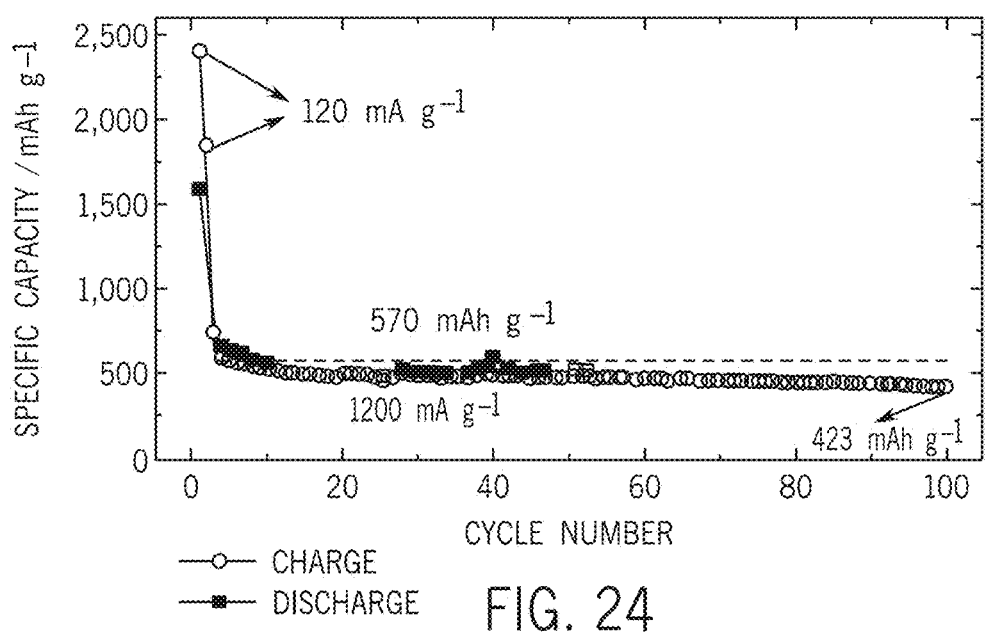
Figure 25:
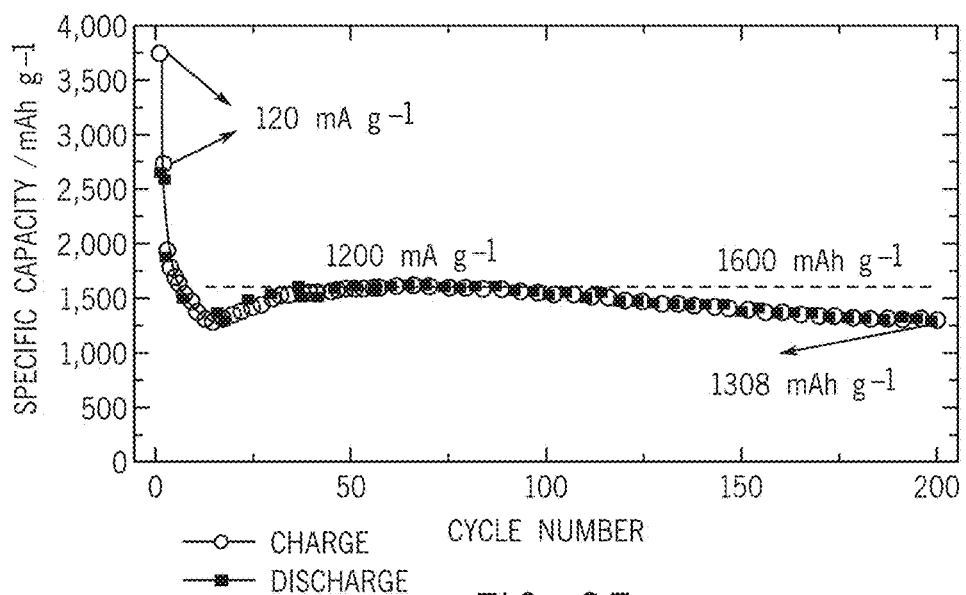

FIGS. 23-26 illustrate the cyclic performance of the example coin cells described above. As shown in FIG. 23, an example coin cell having the cubic hollow Si structures as the anode active material (hereinafter referred to as a cubic Si anode), demonstrated a capacity at 120 milliamperes per gram (mA/g) of approximately 1,482 milliampere hours per gram (mAh/g). At a higher current density of 1,200 mA/g (i.e., C/2), this example cubic Si anode exhibited a capacity of 470 mAh/g and retained 239 mAh/g (i.e., approximately 62%) of its reversible capacity. As shown in FIG. 24, an example coin cell having the spherical hollow Si structures as the anode active material (hereinafter referred to as a spherical Si anode), demonstrated a capacity at 120 mA/g of approximately 1,592 mAh/g. At a higher current density of 1,200 mA/g (i.e., C/2), this spherical Si anode exhibited a capacity of 570 mAh/g and retained 432 mAh/g (i.e., approximately 76%) of its reversible capacity. As shown in FIG. 25, an example coin cell having the tubular Si structures as the anode active material (hereinafter referred to as a tubular Si anode) demonstrated a capacity of approximately 2,624 mAh/g at 120 mA/g. After 2-cycle activation, the tubular Si anode was cycled at 1,200 mA/g for 200 cycles, retaining 1,308 mAh/g (i.e., approximately 80.0%) of its reversible capacity at a current density of 1,600 mA/g.

Figure 26:
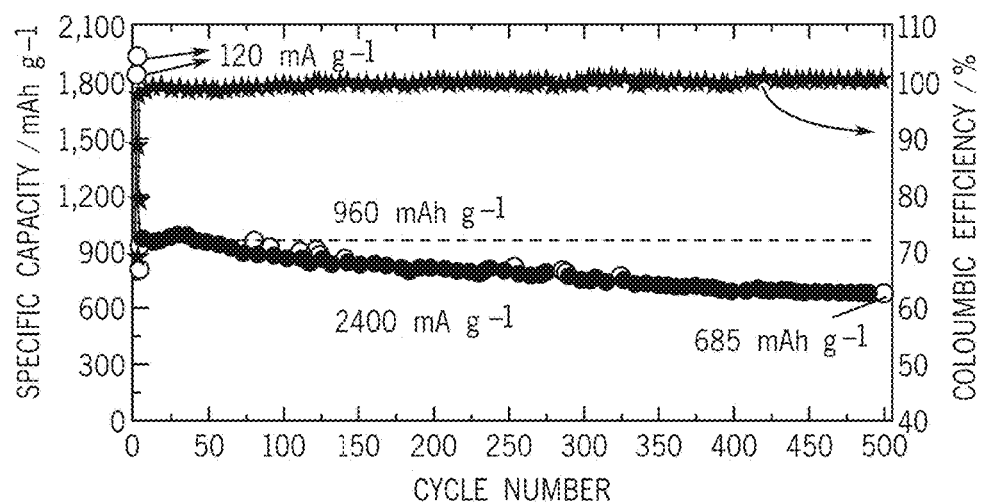
Figure 27:
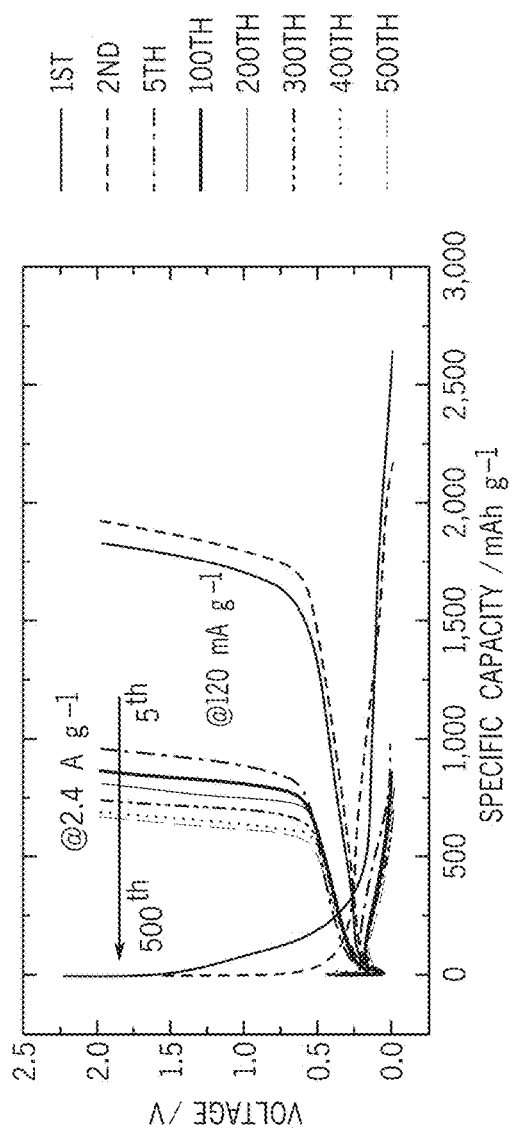
Figure 28:
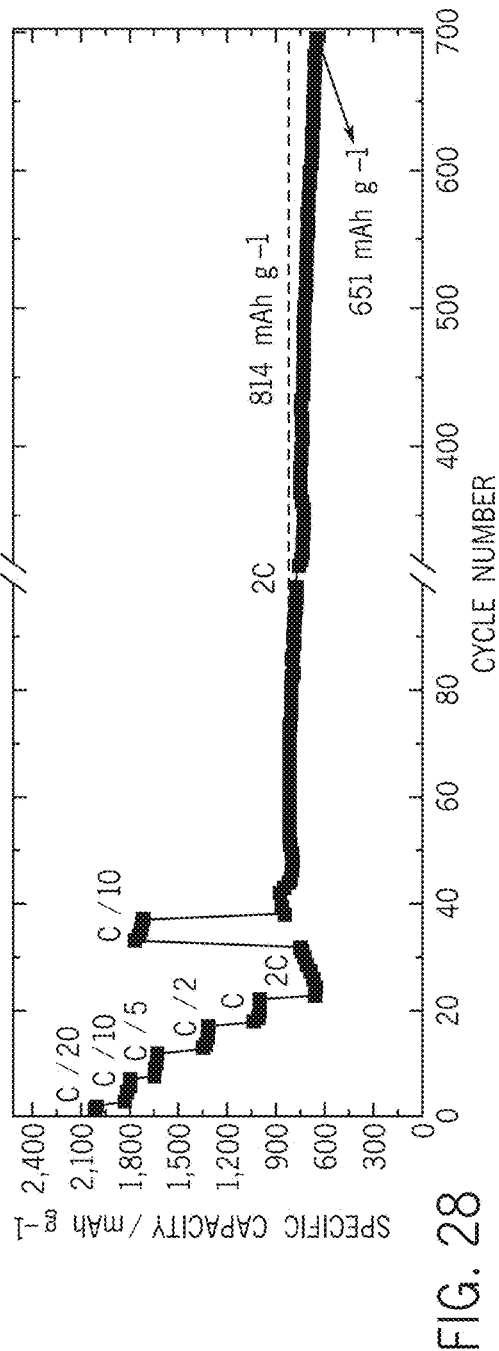

FIGS. 26 and 27 illustrate the cyclic performance of an example coin cell having the flower hollow Si structures as the anode active material (hereinafter referred to as a flower Si anode). After activation at 120 mA/g for the initial two cycles, the example flower Si anode delivered a capacity of 960 mAh/g at 2,400 mA/g (i.e., 1 C) and showed an excellent cyclic performance. More specifically, after 500 cycles the example flower Si anode still retained 685 mAh/g (i.e., approximately 71%) of its reversible capacity. As shown in FIG. 28, the example flower Si anode exhibited a moderate rate capability, with a capacity of 814 mAh/g at 4,800 mA/g (i.e., 2 C), which is approximately 41% of its capacity at 120 mA/g. After the rate performance test, the example flower Si anode was cycled for additional 663 cycles at 4,800 mA/g, maintaining 651 mAh/g (i.e., approximately 80%) of its reversible capacity. These results demonstrate that the flower Si structure enables improved cyclic performance relative to the Si-based active materials used by traditional Si anodes.

It may be noted that the capacities of the example cubic Si anodes and the example spherical Si anodes, as respectively illustrated in FIGS. 23 and 24, are lower than those of the example flower Si anodes and tubular Si anodes, as respectively illustrated in FIGS. 25 and 26. It is believed that this difference is a result of the relatively larger particle sizes of the cubic and spherical Si structures (e.g., 5-10 µm). Since Si is a semiconductor, the larger particle size can lead to less efficient electron transport and greater polarization during the charging and discharging processes. It is also believed that, for the flower Si anode, since the conductive carbon can more easily access the petals 10 of the flower Si structures during the slurry-making process, the inner and outer walls the petals 10 of the flower Si structures are in better contact with the conductive carbon particles than are the inner and outer walls of the cubic and spherical Si structures. This enables increased electrical conductivity for the flower Si anode and reduces polarization during charging and discharging, resulting in a better rate capability. Compared with the cubic Si anode, the spherical Si anode demonstrates better cyclic performance, which is believed to result from the spherical hollow Si structures being relatively more stable upon volume change during cycling.

Figure 29:
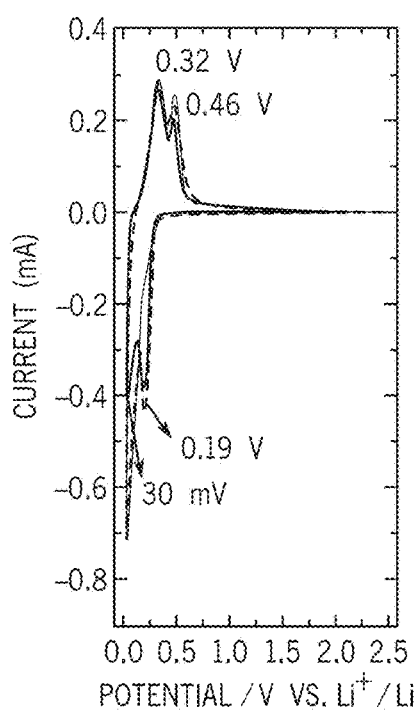
FIG. 29 illustrates results from cyclic voltammetry (CV) analysis of an example flower Si anode measured using a three-electrode cell, in accordance with present embodiments.

FIG. 29 illustrates results from cyclic voltammetry (CV) analysis of the example flower Si anode measured using a three-electrode cell, with the hollow Si electrode as a working electrode, a lithium disk as a counter electrode, and a lithium ring as a reference electrode. The CV curves illustrated in FIG. 29 show two pairs of typical peaks due to various $Li_xSi$ phases. The well overlapped peaks, after activation of the anode during the initial anodic scan, are consistent with the excellent cyclic performance of the flower Si anode discussed above.

Figure 30:
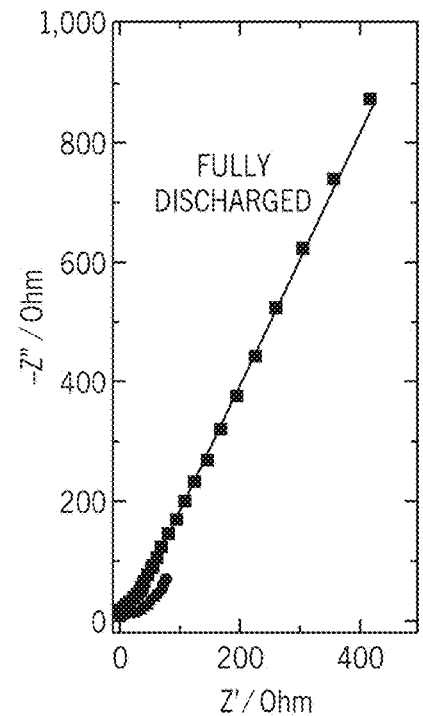
FIGS. 30 and 31 are Nyquist plots that illustrate impedance of the example flower Si anode after activation, in accordance with present embodiments.
Figure 31:
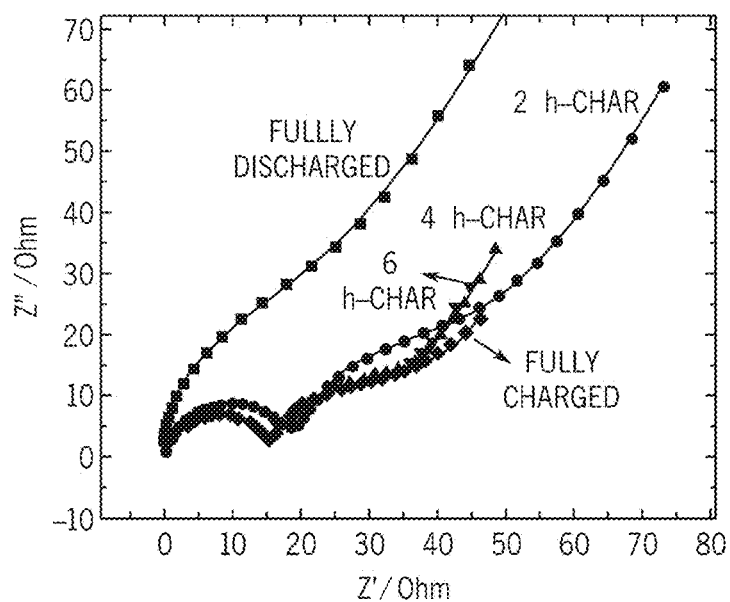

FIGS. 30 and 31 are Nyquist plots that illustrate impedance of the example flower Si anode after activation. As shown in FIGS. 30 and 31, at a fully discharged state, the Si flower anode demonstrates only lithium ion diffusion at the electrolyte/electrode interface since the potential of the anode is 1.38 V, much higher than the electrochemical redox potentials of $Li_xSi$, as indicated by CV curves of FIG. 29. To evaluate the impedance of the solid-electrolyte interphase (SEI), the charge transfer, and the lithium ion diffusion in the solid phase, the flower Si anode should be charged. FIG. 31 is a Nyquist plot for the example flower Si anode at various states of charging, while the anode was allowed to rest for 2 h. After charging for 4-6 h at a current density of 240 mA/g, the example flower Si anode exhibited a relatively stable electrical impedance spectrum (EIS), which indicated a resistance of the bulk (including electrolyte and contact resistances) of approximately 0.23 Ohm, a SEI resistance of approximately 16 Ohm, a charge transfer resistance of approximately 4.4 Ohm, and a resistance of lithium ion diffusion in the solid phase of approximately 49.2 Ohm. It should be appreciated that the impedance values enabled by the flower Si structures are lower than those of previously reported Si anodes and even carbon-containing Si anodes.

Figure 32:
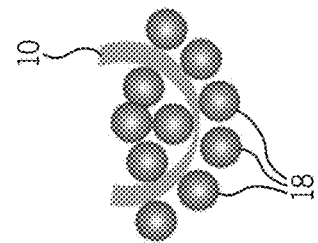
FIG. 32 is a schematic illustrating behavior of the flower Si structure as an anode active material during charging and discharging cycles, in accordance with present embodiments.
Figure 32:
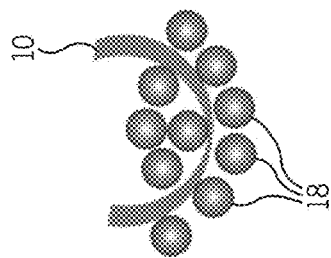
Figure 32:
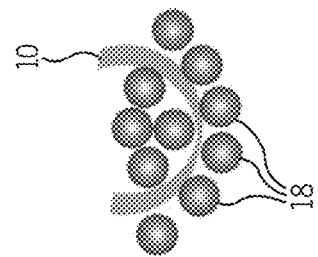
Figure 33:
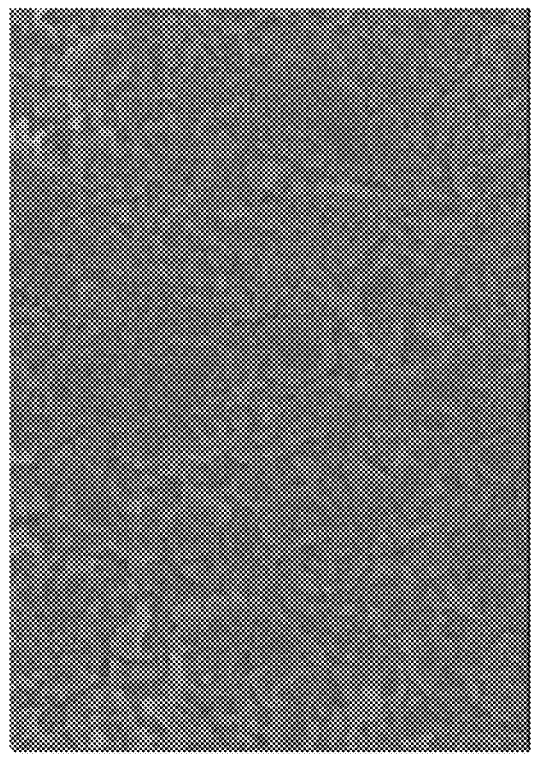
FIG. 33 is a low-magnification SEM image illustrating an example flower Si anode after 200 cycles at a 1 C rate, in accordance with present embodiments.
Figure 35:
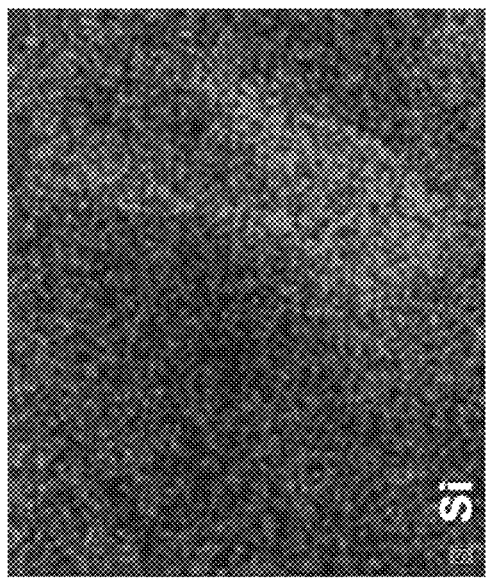
FIG. 35 is the corresponding Si elemental mapping of the petal of FIG. 34, in accordance with present embodiments.
Figure 36:
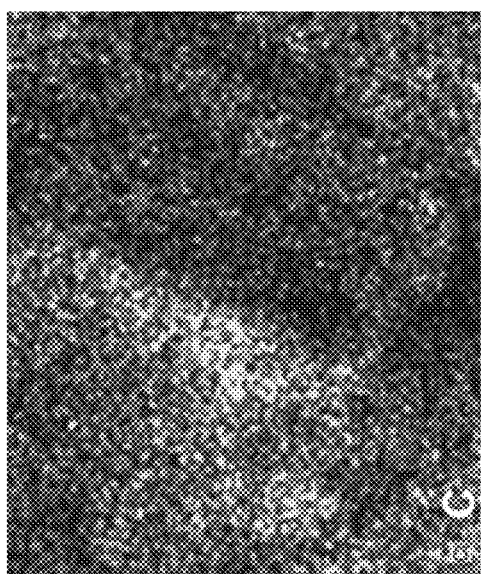
FIG. 36 is the corresponding Si elemental mapping of the petal of FIG. 34, in accordance with present embodiments.
Figure 34:
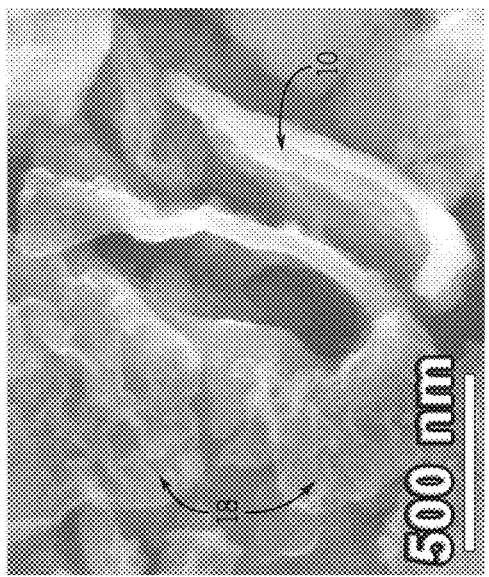
FIG. 34 is a SEM image of a petal of a flower Si structure that is the active material of an anode after 200 cycles, in accordance with present embodiments.

It may be appreciated that, for other Si anodes that utilize solid Si structures, such particles typically lose contact with the conductive carbon and binder after repeated volume changes upon cycling. However, as illustrated by the schematic of FIG. 32, the flower Si structures have many voids that allow Si to expand inwardly, similar to other hollow Si structures. Moreover, the petals 10 of the flower Si structures facilitate stress relaxation upon lithiation along the 2D wall of the structures as well as along the conventional radial direction. It is believed that this unique morphology limits or prevents cracking and pulverization of the flower Si anode, and maintains good contact between the petals 10 of the Si structure and the conductive carbon 18, during cycling. For example, FIG. 33 is a low-magnification SEM image illustrating an example flower Si anode after 200 cycles at 2,400 mA/g (i.e., 1 C). While some cracking is observed, this cracking is substantially less than the cracking observed for bulk Si anodes or thin-film Si anodes. In addition, as illustrated by the SEM image of FIG. 34, in conjunction with the corresponding Si elemental mapping in FIG. 35 and carbon mapping in FIG. 36, the petals 10 of the flower Si structures is still observed to be present and in good contact with the conductive carbon 18 after 200 cycles.

It is noted that the anodes utilizing the disclosed hollow Si structures demonstrate relatively low initial Columbic efficiencies (e.g., approximately 70%), which may result from small amounts of silicon oxide on the surface of the hollow Si and/or from the high specific surface areas of the hollow Si structures (e.g., 54.5 square meters per gram ($m^2/g$) for the flower Si structures, 63.1 $m^2/g$ for the tubular Si structures, based on Brunauer-Emmett-Teller (BET) analysis). Upon initial lithiation, silicon oxide is irreversibly reduced to Si as a $Li_xSi$ alloy, and the SEI layer forms, which is accompanied with decomposition of the electrolyte. As such, it is believed that coating the disclosed hollow Si structures with carbon may help to limit or prevent Si surface oxidization and to limit or reduce the electrolyte consumption while building up the SEI layer on the coated carbon surface. Further, it is believed that polymerizing a conducting hydrogel to coat the disclosed hollow Si structures may further improve cyclic performance.

Figure 37:
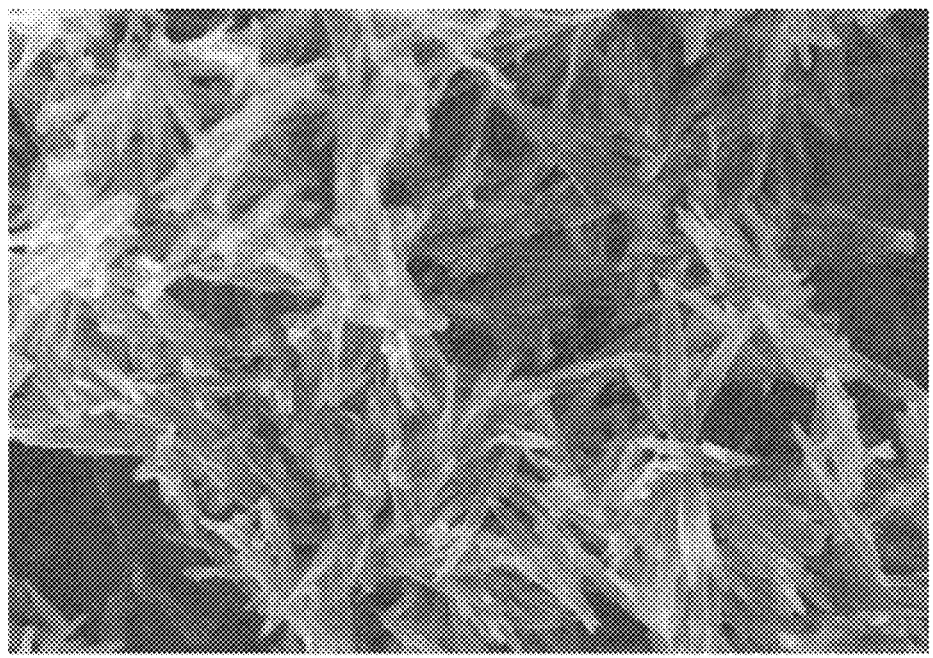
FIGS. 37 and 38 are SEM images of hollow carbon structures manufactured using carbonate templates, in accordance with present embodiments.
Figure 38:
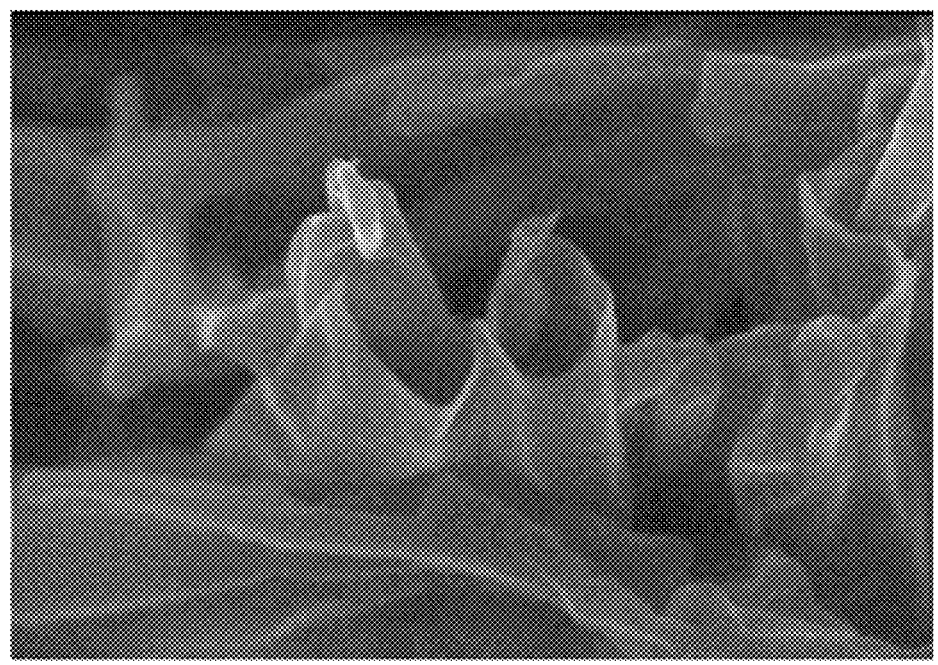

It may also be noted that hollow structures made of other materials can also be produced using the disclosed technique. For example, hollow structures made of carbon (C) or tin (Sn) may be formed using carbonate structures as templates that can be subsequently removed after C or Sn deposition. By specific example, FIGS. 37 and 38 are SEM images of carbon nanotubes that were fabricated by using CVD and carbonate template particles. More specifically, the example C structures illustrated in FIGS. 37 and 38 were made by first synthesizing the rod-like template particles of $BaCO_3$ illustrated in FIG. 3. Template synthesis was followed by carbon CVD using acetylene as the feedstock gas at a flow rate of approximately 30 mL/min for approximately 15 min at approximately 620° C. Carbon deposition was followed by removal of the carbonate template using a dilute HCl solution. It should be appreciated that, since the example C structures illustrated in FIGS. 37 and 38 were formed using the aforementioned carbonate template particles, these hollow C structures are completely free of carbon-growth catalysts (e.g., transition metal-based catalysts, such as iron-based or cobalt-based carbon-growth catalysts) typically used in the synthesis of other hollow C structures. It should be further appreciated that such catalysts can be difficult or impossible to completely remove and their presence can be problematic to certain applications. In contrast, the disclosed technique enables the synthesis of high purity hollow structures of tunable size and morphology, based on the dimensions and morphology of the carbonate template and the conditions of the material deposition. As such, the disclosed technique enables the manufacture of a range of different hollow structures using a number of different deposition materials.

The technical effects of the present technique include using carbonate structures as templates to synthesize hollow Si structures. The disclosed method of manufacturing the carbonate template structures and the hollow Si structures is facile and scalable. Additionally, the disclosed hollow Si structures can be produced without the use of surfactants or HF, which reduces handling and waste disposal costs. The morphology of the disclosed hollow Si structures is tunable by modifying the synthetic conditions when forming the carbonate template structures and when depositing the Si layer on these template structures. As such, the presently disclosed technique enables the production of hollow cubes, hollow spheres, and hollow tubes with substantially no carbon or oxygen impurities. Moreover, the presently disclosed technique enables the production of a novel hollow Si structure, the flower Si structure, which demonstrates excellent cycling performance as an anode active material, retaining approximately 80% of its reversible capacity after 700 cycles. Considering that many carbonates have been produced with various morphologies and particle sizes, the disclosed technique of using carbonates as templates can generally be employed for controllable fabrication of hollow Si structures with desired morphology and particle sizes.

The invention claimed is:

1. A hollow, micron/nano-scale silicon structure having an oxygen content less than approximately 9%, wherein the interior of the hollow micron/nano-scale silicon structure is substantially free of carbon, wherein the micron/nano-scale silicon structure has a flower morphology that comprises a plurality of curled petals extending out from a central portion of the micron/nano-scale silicon structure.

2. The micron/nano-scale silicon structure of claim 1, wherein the micron/nano-scale silicon structure has a length less than approximately 50 μm.

3. The micron/nano-scale silicon structure of claim 2, wherein the length of the micron/nano-scale silicon structure is less than approximately 20 μm.

4. The micron/nano-scale silicon structure of claim 3, wherein the length of the micron/nano-scale silicon structure is between approximately 5 μm and 10 μm.

5. The micron/nano-scale silicon structure of claim 1, wherein the plurality of curled petals each have a thickness less than approximately 100 nm.

6. The micron/nano-scale silicon structure of claim 1, wherein the plurality of curled petals each have a thickness of approximately 40 nm.

7. The micron/nano-scale silicon structure of claim 1, wherein a distance between two of the plurality of curled petals disposed on opposite sides of the central portion is between approximately 1 μm and approximately 20 μm.

8. The micron/nano-scale silicon structure of claim 7, wherein the distance is between approximately 2 μm and approximately 10 μm.

9. The micron/nano-scale silicon structure of claim 1, wherein the micron/nano-scale silicon structure is disposed within an anode active layer of a lithium-ion battery cell.

10. The micron/nano-scale silicon structure of claim 1, wherein each of the plurality of curled petals defines a curved, two dimensional (2D) surface that facilitates stress relaxation upon lithiation.

11. A lithium-ion battery cell, comprising:
an anode having an anode active layer, comprising:
a binder;
a conductive carbon; and
a plurality of hollow flower silicon structures having an oxygen content less than approximately 9%, wherein the interior surfaces of the plurality of hollow flower silicon structures are substantially free of carbon, and wherein each of the plurality of hollow flower silicon structures comprises a plurality of curled petals.

12. The battery cell of claim 11, wherein the lithium-ion battery cell has a capacity greater than 800 milliampere hours per gram (mAh/g) at a current density of 4800 milliamperes per gram (mA/g).

13. The battery cell of claim 11, wherein the lithium-ion battery cell retains at least 70% of its reversible capacity after at least 500 charging and discharging cycles at a 1 C rate.

14. The battery cell of claim 11, wherein the lithium-ion battery cell retains at least 80% of its reversible capacity after at least 700 charging and discharging cycles at a 2 C rate.

15. The battery cell of claim 11, wherein the anode has a bulk impedance that is less than 0.25 Ohm, a solid-electrolyte interphase (SEI) impedance that is less than approximately 20 Ohm, a charge transfer impedance that is less than approximately 5 Ohm, and a lithium ion diffusion impedance in the solid phase that is less than approximately 50 Ohm.

16. The battery cell of claim 11, wherein the lithium-ion battery cell retains at least 60% of its reversible capacity after at least 100 charging and discharging cycles at 2 C.

17. The battery cell of claim 11, wherein the lithium-ion battery cell retains at least 75% of its reversible capacity after at least 100 charging and discharging cycles at 2 C.

18. The battery cell of claim 11, wherein the lithium-ion battery cell retains at least 80% of its reversible capacity after at least 200 charging and discharging cycles at 2 C.

19. The battery cell of claim 11, wherein the plurality of curled petals of each of the plurality of hollow flower silicon structures form a cup-like structure of the plurality of hollow flower silicon structures.

* * * * *